Dec. 1, 1942.   C. N. CROSS   2,303,328
DISPLAY MOUNT
Filed Nov. 22, 1939   2 Sheets-Sheet 1
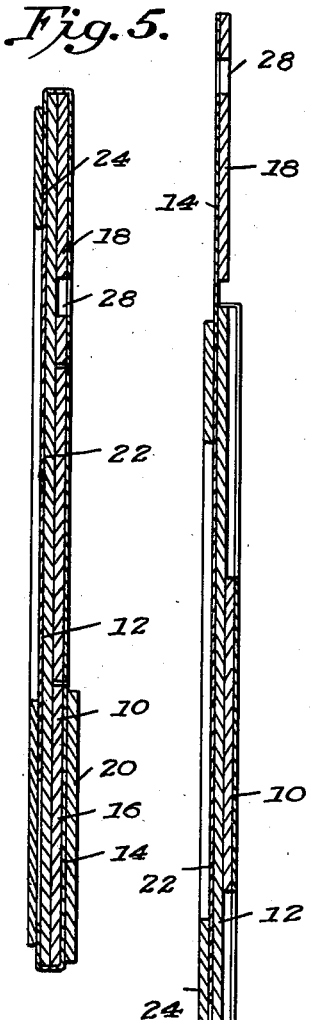
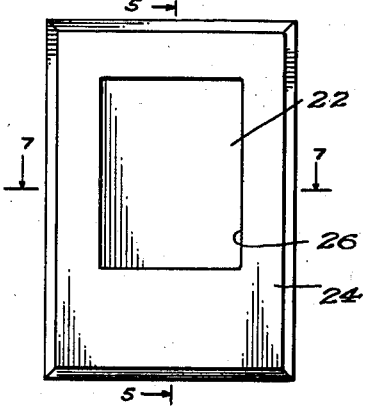
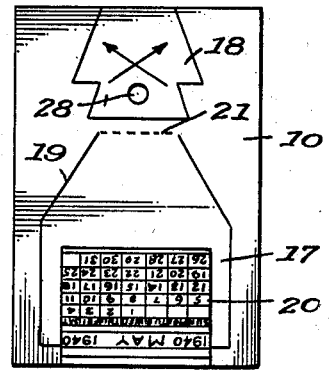
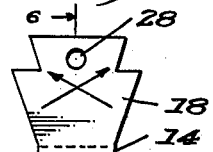
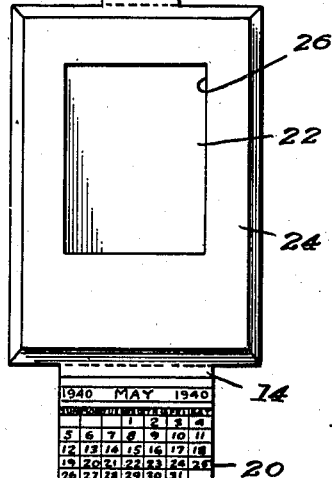
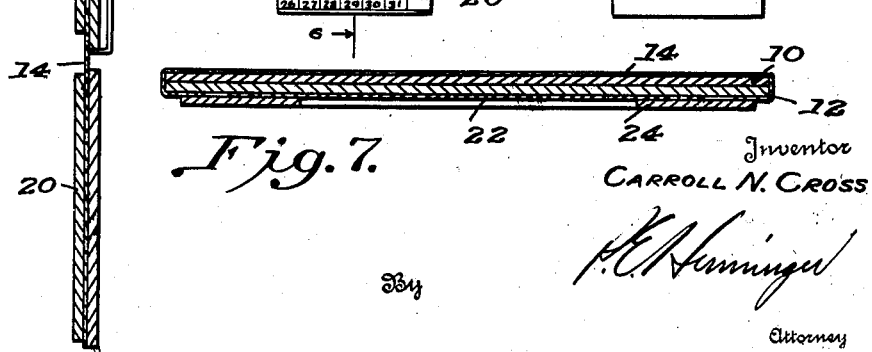
Inventor
CARROLL N. CROSS
By
Attorney

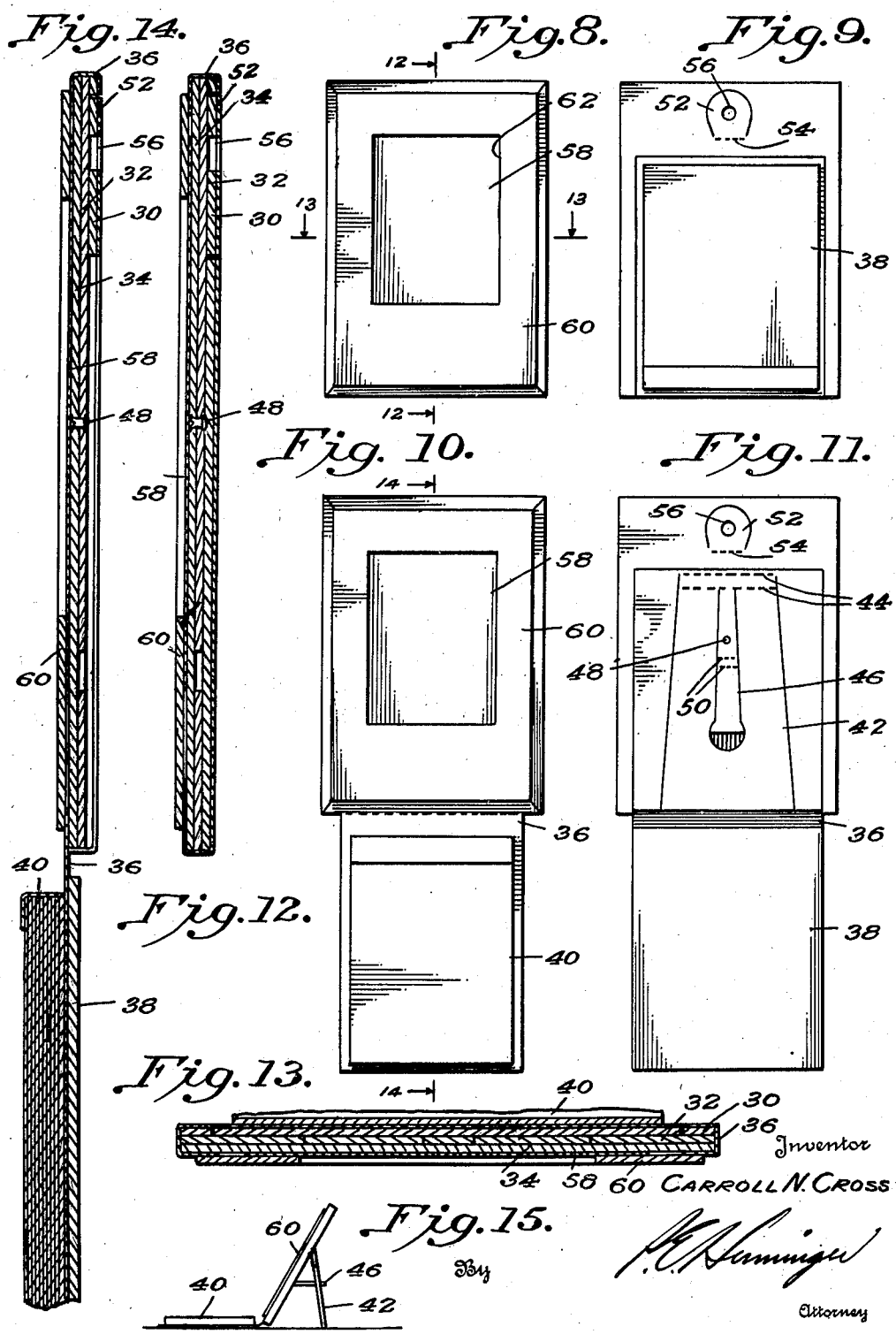

Patented Dec. 1, 1942

2,303,328

UNITED STATES PATENT OFFICE 2,303,328

DISPLAY MOUNT

Carroll N. Cross, Middleboro, Mass.

Application November 22, 1939, Serial No. 305,735

6 Claims. (Cl. 40—152.1)

This invention relates to display mounts. More particularly the invention concerns the provision of a mount adapted to support various indicia in convenient position to assure the effective display thereof.

There has been a wide use of mounts for pictures, calendars, and similar matter as means for distributing sales promotion messages to the public. To compete with other advertising means, such mounts must be capable of production at a low cost, and yet they must be sufficiently attractive and durable to assure their continued use by the recipients thereof.

Heretofore mounts used for advertising purposes have fallen into two classes, namely, one class in which the mounts were substantially constructed at a cost which prohibited their general use, and a second class in which the mounts were cheaply produced, but were so lacking in durability and good appearance as to be undeserving of more than temporary use.

It is, therefore, a broad object of this invention to produce a display mount adapted to advertising purposes which can be produced at a cost sufficiently low to permit wide distribution thereof, and at the same time one which will be so durable and attractive in appearance as to insure its continued use.

Another object of the invention is the provision of a display mount which provides an increased amount of display area by providing extensible indicia carrying portions which can be folded into recesses in the body portion for storage and shipping purposes, and one which is made with economy of materials and labor, and yet provides a stronger and more rigid structure than heretofore possible.

Another object of the invention is to provide a display mount which has substantially plane surfaces, to facilitate stacking and storage thereof, and for the more important purpose of avoiding warping or distortion of the mount, particularly during storage.

Further objects and advantages of the invention will become apparent as the description thereof is read with reference to the drawings in which like reference numerals indicate like parts in the several figures, and in which:

Figure 1 is a face view of one embodiment of the invention;

Figure 2 is a back view of the embodiment shown in Figure 1;

Figure 3 is a face view corresponding to that of Figure 1 and shows body panels moved into indicia displaying position;

Figure 4 is a view taken from the rear of Figure 3;

Figure 5 is a sectional view taken on line 5—5 of Figure 1;

Figure 6 is a sectional view taken on line 6—6 of Figure 3;

Figure 7 is a sectional view taken on line 7—7 of Figure 1;

Figure 8 is a face view of a modified form of the invention;

Figure 9 is a view taken from the rear of Figure 8;

Figure 10 is a face view corresponding to that of Figure 8, and shows a body panel moved into indicia displaying position;

Figure 11 is a view taken from the rear of Figure 10;

Figure 12 is a sectional view taken on lines 12—12 of Figure 8;

Figure 13 is a sectional view taken on lines 13—13 of Figure 8;

Figure 14 is a sectional view taken on lines 14—14 of Figure 10; and

Figure 15 is a reduced scale, side elevational view of the modified form of mount in indicia displaying position.

In the embodiment of the invention illustrated in Figures 1 to 7 of the drawings, the display mount is adapted to be hung on a wall or supported on a desk by means of an easel provided therein. The mount is constructed of a plurality of boards generally designated at 10 and 12. These boards are light weight flexible boards, preferably of cardboard stock. The board 10 is a backboard, while the board 12, for the purpose of description, may be termed an intermediate board or a second board. These two boards 10 and 12 are preferably substantially coextensive and may be joined into a unitary structure by means of a flexible binding material 14 which preferably extends over the entire surface of the backboard 10 and terminates on the face of the second board 12.

The use of flexible binding material 14 is not necessary at all edges of the boards 10 and 12, but should be used at least at those edges at which indicia displaying panels are to be hinged. Indicia displaying panels 16 and 18 are shown as extending from two edges of the mount, but their location and their number is, of course, optional. The indicia displaying panels 16 and 18 are formed in the backboard 10 by cuts which extend through the flexible binding material 14 and the blackboard. The panels 16 and 18 are thereby provided to swing angularly about the edges of the mount into indicia displaying position, while using as hinges the portions of the flexible binding 14 which join them to the body of the mount. The indicia displaying panels 16 and 18 may be made in any desired shape such as the shape of various trade-mark emblems or the like, or they may be of rectilinear contour or any other desired shape. The panel 16 has herein been illustrated as being provided on the face thereof with a calendar sheet 20, while the panel 18 has been illustrated as defining the outline of a trade-mark emblem. It is obvious that either or both panels 16 and 18 may have imprinted thereon any suitable or desirable subject matter.

By forming the panels 16 and 18 as hereinabove described, there is provided a display mount having extensible indicia bearing portions which can be folded into the backboard recesses from which they have been formed. By this construction a display mount is provided which has substantially plane surfaces which facilitate the stacking and storage thereof, and which will not be subject to warping or distortion when stored in large stacks. Furthermore, a maximum amount of indicia bearing space is provided in a mount of minimum overall dimensions.

In order to adapt the mount for desk use there is provided a supporting easel or strut 17 which is formed in the backboard 10 by cuts 19 which permit the same to swing away from the backboard about the score lines 21. It is to be noted that the panel 16 is formed from that portion of the backboard which defines the supporting strut 17. When this form of the mount is used on a desk by bringing into use the supporting strut 17, the indicia bearing panel 16 may be swung angularly about the hinge member 14 to lie flat upon the supporting desk surface, as in the case of the mount illustrated in Figure 15.

The display mount is further enhanced by the provision of a picture or photograph 22 associated with the face thereof. The photograph 22 may be of such dimensions as to extend over the terminal edges of the flexible binding member 14 so as to conceal these edges. The photograph 22 may be mounted upon the surface of the second board 12 by means of gluing, or there may be provided a facing member 24 which is adapted to extend over the terminal edges of the flexible binding member 14 to conceal the same. The facing member 24 may have its outer marginals coextensive with the outer margins of the boards 10 and 12, but a more artistic effect is produced when the outer margins of the facing member 24 terminate short of the marginal edges of the boards 10 and 12. The facing member 24 has provided therein a picture display window 26 through which the picture or photograph 22 may be viewed.

The indicia displaying panel 18 is provided with a passage 28 adapted to receive a pin or hook for the purpose of suspending the display mount in display position.

The same objects of the invention are attained in the modified form of the invention illustrated in Figures 8–15 of the drawings. The modified form of the invention is particularly adapted for desk use, although the same has provisions permitting suspension from a pin or the like.

In the modified form of the invention, the mount consists of a backboard 30, an intermediate board 32, and a faceboard 34. The boards 30, 32 and 34 are joined into a unitary structure by means which include a flexible binding material 36 which extends over the outer surface of the backboard 30 and at least the lower edge of the three boards. In the most convenient practice, the boards 30, 32 and 34 have marginal edges which are substantially coextensive and the boards are joined into a unitary structure by means of the flexible binding material 36 which extends over the backboard 30, around the four marginal edges of the three boards and terminates on the outer surface of the faceboard.

The board 30 has formed therein a panel member 38 by cuts which extend through the flexible binding material 36 and the backboard 30 to form a substantially rectangular panel which is adapted to swing about the lower edge of the mount upon the portion of the flexible binding material 36 which passes about the bottom edge of the mount. The panel 38 may carry any suitable indicia, although in the drawing the same is illustrated as providing a support for a desk pad 40.

The intermediate board 32 has formed therein a supporting easel or strut 42 which is formed by cuts extending through the intermediate board and terminating at the lower edge of the board so as to provide a strut which may be moved angularly away from the body of the mount about score lines 44. The strut 42 has formed in the body thereof, a locking tongue 46 which may have a portion thereof attached to the faceboard by means of a rivet 48 located above a set of score lines 50. When the strut 42 is moved about the score lines 44 into mount supporting position and the locking tongue 46 is moved about the score lines 50, to a position in which the edges of the tongue 50 engage the edges of the slot in which it lies, the strut 42 will be held firmly against collapse. In its inoperative position, the strut 42 and its locking tongue 50 will lie within the plane of the intermediate board so as to permit the mount to be suspended from a holder 52 which is provided near the top of the mount. The holder is formed by cuts extending through the backboard and is provided with a score line 54 about which the same may be moved to permit passage of a pin through the hole 56.

The face construction of the mount comprising the modified form of the invention is substantially the same as that illustrated in the principal embodiment in that a picture or the like 58 may be associated with the outer surface of the faceboard 34. The picture 58 may be applied to the faceboard 34 by gluing the same therein, and it may be of such dimensions as to extend over and cover the terminal edges of the binding material 36. If desired, however, a facing member 60 may be used for the purpose of retaining the picture in place, and for the further purpose of concealing the terminal edges of the flexible binding material 36. The facing member 60 may be coextensive with the margins of the faceboard 34 or it may be non-coextensive therewith, as may be desired. In any event, the same is provided with a picture display window 62 through which the underlying picture or the like may be viewed.

It will be observed that both forms of the mount provide an increased amount of display area by providing extensible indicia carrying portions which can be folded into recesses in the body portion of the mounts for storage and shipping purposes. The construction described results in a durable product which may be used for an indefinite length of time without losing its shape or attractive appearance.

The forms of the invention illustrated in the drawings are simply illustrative embodiments, and it is obvious that the invention may assume still other forms without losing the essential benefits thereof, and it is therefore to be understood that the practice of the invention is not to be limited in any way other than by limitations imposed by the subjoined claims.

I claim:

1. A mount for pictures and the like comprising a plurality of boards including a faceboard and a backboard joined together by means of a thin flexible binding material at edges thereof to form a unitary body structure, a panel formed in said backboard at each of a plurality of edges by cuts extending to such edges whereby said flexible binding constitutes a hinge permitting said panels to move angularly about said edges into a position forming an extension of the body of said mount, indicia carried on the face of at least one of said panels, and a passage in one of said panels whereby the mount may be suspended with both of said panels in extended position.

2. A mount for pictures and the like comprising a plurality of boards including a faceboard and a backboard joined together by means of a thin flexible binding material at the top and bottom edges thereof to form a unitary body structure, an indicia carrying panel formed in said backboard by a cut extending to the bottom edge thereof, whereby said flexible binding constitutes a hinge permitting said panel to be moved angularly about said bottom edge into extended indicia displaying position, a second panel formed in said backboard by a cut extending to the upper edge thereof whereby said flexible binding at said upper edge constitutes a hinge permitting said panel to be moved into extended position about said edge, and a passage in said second panel whereby the mount may be suspended with both of said panels in extended position.

3. A mount for pictures and the like comprising a plurality of boards including a faceboard, a backboard, and an intermediate board joined together by means of a thin flexible binding material at at least the bottom edge thereof to form a unitary structure, an indicia bearing panel formed in said backboard by cuts extending to the bottom edge thereof whereby said flexible binding material constitutes a hinge permitting said panel to be moved angularly about said edge into indicia displaying position, and a supporting leg cut from said intermediate board adapted to be moved from the plane thereof into an angular mount supporting position.

4. A mount for pictures and the like comprising a plurality of substantially coextensive boards including a faceboard, a backboard, and an intermediate board joined together by means of a thin flexible material at edges thereof to form a unitary structure, an indicia bearing panel formed in said backboard by cuts extending to the bottom edge thereof whereby said flexible binding material constitutes a hinge permitting said panel to be moved angularly about said edge into indicia displaying positon, a supporting leg cut from said intermediate board adapted to be moved from the plane of said board into an angular mount supporting position and a member overlying said faceboard and attached thereto for retaining a picture or the like thereon in display position.

5. A mount for pictures and the like comprising a plurality of boards including a faceboard and a backboard joined together along their edges by a flexible binding material to form a unitary structure, a wide supporting leg cut from said backboard, said supporting leg having its free end adjacent the bottom of said mount and being attached to said backboard at its top to adapt the same to be moved from the plane of said board into an angular mount supporting position, and an indicia supporting panel formed from the body of said supporting leg by cuts extending to the bottom edge of the mount whereby said flexible binding material constitutes a hinge permitting said panel to be moved angularly about said edge into indicia displaying position.

6. A mount for pictures and the like comprising a plurality of substantially coextensive boards including a faceboard, a backboard, and an intermediate board joined together by means of a flexible binding material extending over the whole surface of the backboard, about edges of said boards and terminating on said faceboard to form a unitary structure, an indicia bearing panel formed in said backboard by parallel cuts extending to the bottom edge thereof and joined by a cut extending between the said parallel cuts at the inner extremities thereof, whereby said flexible binding material constitutes a hinge at said bottom edge permitting said panel to be moved angularly about said edge into indicia displaying position, a supporting leg cut from said intermediate board adapted to be moved from the plane of said board into an angular mount supporting position, and a member attached to said faceboard in a position overlying the terminal edges of said binding material.

CARROLL N. CROSS.